United States Patent
Zhao et al.

(10) Patent No.: US 12,255,844 B2
(45) Date of Patent: Mar. 18, 2025

(54) METHOD PERFORMED BY USER EQUIPMENT, AND USER EQUIPMENT

(71) Applicant: Sharp Kabushiki Kaisha, Sakai (JP)

(72) Inventors: Yinan Zhao, Shanghai (CN); Renmao Liu, Shanghai (CN); Chao Luo, Shanghai (CN)

(73) Assignee: SHARP KABUSHIKI KAISHA, Sakai (JP)

( * ) Notice: Subject to any disclaimer, the term of this patent is extended or adjusted under 35 U.S.C. 154(b) by 298 days.

(21) Appl. No.: 17/790,518

(22) PCT Filed: Jan. 4, 2021

(86) PCT No.: PCT/CN2021/070104
§ 371 (c)(1),
(2) Date: Jul. 1, 2022

(87) PCT Pub. No.: WO2021/139619
PCT Pub. Date: Jul. 15, 2021

(65) Prior Publication Data
US 2023/0039007 A1   Feb. 9, 2023

(30) Foreign Application Priority Data
Jan. 6, 2020 (CN) .......................... 202010011777.3

(51) Int. Cl.
*H04L 5/00* (2006.01)
*H04W 72/20* (2023.01)
*H04W 76/14* (2018.01)
*H04W 92/18* (2009.01)

(52) U.S. Cl.
CPC .......... *H04L 5/0053* (2013.01); *H04W 72/20* (2023.01); *H04W 76/14* (2018.02); *H04W 92/18* (2013.01)

(58) Field of Classification Search
None
See application file for complete search history.

(56) References Cited

U.S. PATENT DOCUMENTS

2020/0288286 A1* 9/2020 Hwang ............... H04L 27/2607
2020/0313825 A1* 10/2020 Ryu .................... H04W 72/20
2022/0417070 A1* 12/2022 Yoshioka ............. H04L 1/1861
(Continued)

FOREIGN PATENT DOCUMENTS

KR   10-2019-017551   *   9/2019

OTHER PUBLICATIONS

Author Unknown, Sidelink physical layer procedures for NR V2X, Doc. No. R1-1911887, pp. 1-30 (Year: 2019).*
(Continued)

*Primary Examiner* — Christopher M Crutchfield
(74) *Attorney, Agent, or Firm* — Keating & Bennett, LLP (57) ABSTRACT

Provided in the present invention are a method performed by user equipment, and user equipment. The method comprises: determining sidelink resource pool configuration information to be first configuration information (S101); receiving, from another user equipment, sidelink control information (SCI) and a corresponding or associated physical sidelink shared channel (PSSCH) (S102); and determining a cyclic shift of a physical sidelink feedback channel (PSFCH) corresponding to the PSSCH.

2 Claims, 4 Drawing Sheets

(56) References Cited

U.S. PATENT DOCUMENTS

2023/0028762 A1* 1/2023 Choi ..................... H04L 1/1896

OTHER PUBLICATIONS

Author Unknown, On Physical Layer Procedures for NR V2X, Doc. No. R1-1912464 pp. 1-6 (Year: 2019).*
Official Communication issued in International Patent Application No. PCT/CN2021/070104, mailed on Mar. 26, 2021.
MCC Support, "Final Report of 3GPP TSG RAN WG1 #99 v.1.0.0", 3GPP TSG-RAN WG1 Meeting #100-e, R1-2000151, Feb. 24-Mar. 6, 2020, pp. 1-163.
MCC Support, "Final Report of 3GPP TSG RAN WG1 #98bis v2.0.0", 3GPP TSG-RAN WG1 Meeting #99, R1-1913275, Nov. 18-22, 2019, pp. 1-160.
MCC Support, "Final Report of 3GPP TSG RAN WG1 #97 v1.0.0", 3GPP TSG-RAN WG1 Meeting #98, R1-1907973, Aug. 26-30, 2019, pp. 1-163.
MCC Support, "Final Report of 3GPP TSG RAN WG1 #96b v1.0.0", 3GPP TSG-RAN WG1 Meeting #97, R1-1905921, May 13-17, 2019, pp. 1-159.
MCC Support, "Final Report of 3GPP TSG RAN WG1 #AH_1901 v1.0.0", 3GPP TSG-RAN WG1 Meeting #96, R1-1901483, Feb. 25-Mar. 1, 2019, pp. 1-100.
MCC Support, "Final Report of 3GPP TSG RAN WG1 #95 v1.0.0", 3GPP TSG-RAN WG1 Meeting #96, R1-1901482, Feb. 25-Mar. 1, 2019, pp. 1-172.
MCC Support, "Final Report of 3GPP TSG RAN WG1 #94bis v1.1.0", 3GPP TSG-RAN WG1 Meeting #95, R1-1813901, Nov. 12-16, 2018, pp. 1-198.
Vodafone, "New SID: Study on NR V2X", 3GPP TSG RAN Meeting #80, RP-181429, retrieved from RP-181480, Jun. 11-14, 2018, 5 pages.
Huawei et al., "New WID on 3GPP V2X Phase 2", 3GPP TSG RAN Meeting #75, RP-170798, Mar. 6-9, 2017, 5 pages.
LG Electronics et al., "New WI proposal: Support for V2V services based on LTE sidelink", 3GPP TSG RAN Meeting #70, RP-152293, Dec. 7-10, 2015, 8 pages.
Qualcomm Inc., "Work Item Proposal for Enhanced LTE Device to Device Proximity Services", 3GPP TSG RAN Meeting #66, RP-142311, Dec. 8-11, 2014, 8 pages.
Qualcomm Inc., "Work item proposal on LTE Device to Device Proximity Services", 3GPP TSG RAN Meeting #63, RP-140518, Mar. 3-6, 2014, 7 pages.
Samsung, "Introduction of V2X in NR", 3GPP TSG RAN Meeting #86, RP-193124, Dec. 9-12, 2019, 17 pages.

* cited by examiner

METHOD PERFORMED BY USER EQUIPMENT, AND USER EQUIPMENT

TECHNICAL FIELD

The present disclosure relates to the technical field of wireless communications, and in particular to a method performed by user equipment, a method performed by a base station, and corresponding user equipment.

BACKGROUND

In conventional cellular networks, all communication needs to be forwarded via base stations. By contrast, D2D communication (device-to-device communication) refers to a technique in which two user equipment units directly communicate with each other without needing a base station or a core network to perform forwarding therebetween. A research project on the use of LTE equipment to implement proximity D2D communication services was approved at the 3rd Generation Partnership Project (3GPP) RAN #63 plenary meeting in March 2014 (see Non-Patent Document 1). Functions introduced in the LTE Release 12 D2D include:
1) a discovery function between proximate devices in an LTE network coverage scenario;
2) a direct broadcast communication function between proximate devices; and
3) support for unicast and groupcast communication functions at higher layers.

A research project on enhanced LTE eD2D (enhanced D2D) was approved at the 3GPP RAN #66 plenary meeting in December 2014 (see Non-Patent Document 2). Main functions introduced in the LTE Release 13 eD2D include:
1) a D2D discovery in out-of-coverage and partial-coverage scenarios; and
2) a priority handling mechanism for D2D communication.

Based on the design of the D2D communication mechanism, a V2X feasibility research project based on D2D communication was approved at the 3GPP RAN #68 plenary meeting in June 2015. V2X stands for Vehicle to Everything, and intends to implement information exchange between a vehicle and all entities that may affect the vehicle, for the purpose of reducing accidents, alleviating traffic congestion, reducing environmental pollution, and providing other information services. V2X application scenarios mainly include four aspects:
1) V2V, Vehicle to Vehicle, i.e., vehicle-to-vehicle communication;
2) V2P, Vehicle to Pedestrian, i.e., a vehicle transmits alarms to a pedestrian or a non-motorized vehicle;
3) V2N: Vehicle-to-Network, i.e., a vehicle connects to a mobile network;
4) V2I: Vehicle-to-Infrastructure, i.e., a vehicle communicates with road infrastructure. 3GPP divides the research and standardization of V2X into three stages. The first stage was completed in September 2016, and was mainly focused on V2V and based on LTE Release 12 and Release 13 D2D (also known as sidelink communication), that is, the development of proximity communication technologies (see Non-Patent Document 3). V2X stage 1 introduced a new D2D communication interface referred to as PC5 interface. The PC5 interface is mainly intended to address the issue of cellular Internet of Vehicle (IoV) communication in high-speed (up to 250 km/h) and high-node density environments. Vehicles can exchange information such as position, speed, and direction through the PC5 interface, that is, the vehicles can communicate directly through the PC5 interface. Compared with the proximity communication between D2D devices, functions introduced in LTE Release 14 V2X mainly include:
1) higher density DMRS to support high-speed scenarios;
2) introduction of subchannels to enhance resource allocation methods; and
3) introduction of a user equipment sensing mechanism with semi-persistent scheduling.

The second stage of the V2X research project belonged to the LTE Release 15 research category (see Non-Patent Document 4). Main features introduced included high-order 64QAM modulation, V2X carrier aggregation, short TTI transmission, as well as feasibility study of transmit diversity.

The corresponding third stage, V2X feasibility research project based on 5G NR network technologies (see Non-Patent Document 5), was approved at the 3GPP RAN #80 plenary meeting in June 2018. The research plan of this project include research goals that support sidelink unicast, sidelink groupcast, and sidelink broadcast.

According to the conclusions of the 3GPP RAN1 #94bis meeting in October 2018 (see Non-Patent Document 6), for unicast and groupcast of sidelink communication, it is determined that HARQ feedback and HARQ combining are supported at a physical layer.

In the conclusions of the 3GPP RAN1 #95 meeting in November 2018 (see Non-Patent Document 7), a physical sidelink feedback channel (PSFCH) was introduced to carry HARQ feedback information in sidelink communication, such as HARQ ACK or HARQ NACK, which may be collectively referred to as HARQ-ACK.

At the 3GPP RAN1 AH #1901 meeting in January 2019 (see Non-Patent Document 8), the following conclusions were arrived at concerning the design of an HARQ feedback mechanism for NR V2X groupcast: for groupcast communication, when HARQ feedback is enabled, two HARQ feedback mechanisms are supported, and are as follows:
1) The receiving UE only feeds back HARQ NACK; if the receiving UE decodes a PSCCH correctly but fails to decode a corresponding PSSCH correctly, then the receiving UE feeds back NACK; otherwise, the receiving UE does not perform HARQ feedback.
   a) All receiving UEs in a group share one PSFCH resource used to feed back HARQ NACK.
2) The receiving UE feeds back HARQ ACK and HARQ NACK; if the receiving UE decodes a PSCCH correctly but fails to decode a corresponding PSSCH correctly, then the receiving UE feeds back NACK; if the receiving UE decodes the PSCCH correctly and decodes the corresponding PSSCH correctly, then the receiving UE feeds back ACK.
   a) Each UE in the group uses a separate PSFCH resource to feed back HARQ ACK and HARQ NACK.

In the conclusion of the 3GPP RAN1 #96bis meeting in April 2019 (see Non-Patent Document 9), the following conclusions concerning PSFCH resource configuration were arrived at:
   in a resource pool, PSFCHs are periodically configured in slots of the resource pool, and the period can be denoted as N, where the value of N may be 1, or 2, or 4.

In the 3GPP RAN1 #97 meeting in May 2019 (see Non-Patent Document 10), the following conclusions concerning PSFCH formats were arrived at:

1) In an NR sidelink, a PSFCH format with one OFDM symbol (not including an AGC symbol) is supported. The PSFCH format is designed based on a sequence, taking PUCCH format 0 (a sequence-based PUCCH format) in Rel-15NR as a baseline.
2) The PSFCH format is applicable to two feedback mechanisms in unicast and groupcast.

In the email discussion for the 3GPP RAN1 #98bis meeting in October 2019 (see Non-Patent Document 11), the following conclusions concerning PSFCH were arrived at:
the PSFCH format with one symbol occupies one PRB in a frequency domain.

At the 3GPP RAN1 #99 meeting in November 2019 (see Non-Patent Document 12), the following conclusions concerning PSFCH were arrived at:
one PSFCH is used to transmit sidelink HARQ feedback information including only one bit.

Solutions of the present patent include a method for determining, by sidelink UE, values of cyclic shifts of a sequence during PSFCH transmission.

PRIOR ART DOCUMENTS

Non-Patent Documents

Non-Patent Document 1: RP-140518, Work item proposal on LTE Device to Device Proximity Services
Non-Patent Document 2: RP-142311, Work Item Proposal for Enhanced LTE Device to Device Proximity Services
Non-Patent Document 3: RP-152293, New WI proposal: Support for V2V services based on LTE sidelink
Non-Patent Document 4: RP-170798, New WID on 3GPP V2X Phase 2
Non-Patent Document 5: RP-181480, New SID Proposal: Study on NR V2X
Non-Patent Document 6: RAN1 #94bis, Chairman notes, section 7.2.4.2
Non-Patent Document 7: RAN1 #95, Chairman notes, section 7.2.4.2
Non-Patent Document 8: RAN1 AH #1901, Chairman notes, section 7.2.4.1.4, section 7.2.4.3
Non-Patent Document 9: RAN1 #96bis, Chairman notes, section 7.2.4.5
Non-Patent Document 10: RAN1 #97, Chairman notes, section 7.2.4.5
Non-Patent Document 11: RAN1 #98bis, Minutes Report, [98b-NR-09]
Non-Patent Document 12: RAN1 #99, Chairman notes, section 7.2.4.5

SUMMARY

In order to address at least a part of the aforementioned issues, the present disclosure provides a method performed by user equipment, and user equipment, which are effectively applicable to V2X application scenarios based on 5G NR network technology.

According to an aspect of the present disclosure, provided is a method performed by user equipment. The method includes: determining sidelink resource pool configuration information to be first configuration information; receiving, from another user equipment, sidelink control information (SCI) and a corresponding or associated physical sidelink shared channel (PSSCH); and determining a cyclic shift of a physical sidelink feedback channel (PSFCH) corresponding to the PSSCH.

In the method according to an aspect of the present disclosure, the first configuration information is configuration information transmitted by a base station through radio resource control (RRC) signaling; or the first configuration information is included in pre-configuration information of the user equipment.

In the method according to an aspect of the present disclosure, the first configuration information at least comprises configuration information about the number of cyclic shift pairs $N_{CS}^{PSFCH}$, i.e., second configuration information.

In the method according to an aspect of the present disclosure, the cyclic shift of the PSFCH corresponding to the PSSCH is determined at least according to $$\left(\frac{6}{N_{CS}^{PSFCH}}\right) \times i,$$

where i represents a cyclic shift pair index, and/or has a value range of 0 to $N_{CS}^{PSFCH}-1$.

In addition, according to another aspect of the present disclosure, user equipment is further provided, and comprises: a processor; and a memory having instructions stored therein, wherein the instructions, when run by the processor, perform the above method.

Effect of Invention

According to the present disclosure, provided are a method performed by user equipment, and user equipment, which are effectively applicable to V2X application scenarios based on 5G NR network technology.

BRIEF DESCRIPTION OF THE DRAWINGS

The above and other features of the present disclosure will become more apparent with the following detailed description in conjunction with the accompanying drawings.

DETAILED DESCRIPTION

The following describes the present disclosure in detail with reference to the accompanying drawings and specific embodiments. It should be noted that the present disclosure should not be limited to the specific embodiments described below. In addition, for simplicity, detailed description of the prior art not directly related to the present disclosure is omitted to prevent confusion in understanding the present disclosure.

A plurality of embodiments according to the present disclosure are described in detail below by using a 5G mobile communication system and its subsequent evolved versions as an exemplary application environment. However, it is to be noted that the present invention is not limited to the following embodiments, and rather, it is applicable to many other wireless communication systems, such as a communication system later than 5G and a 4G mobile communication system earlier than the 5G.

Some terms related to the present disclosure are described below. Unless otherwise specified, the terms related to the present disclosure use the definitions herein. The terms given in the present disclosure may be named differently in LTE, LTE-Advanced, LTE-Advanced Pro, NR, and later communication systems, but unified terms are used in the present disclosure. When applied to a specific system, the terms may be replaced with terms used in the corresponding system;

3GPP: 3rd Generation Partnership Project
LTE: Long Term Evolution
NR: New Radio
PDCCH: Physical Downlink Control Channel
DCI: Downlink Control Information
PDSCH: Physical Downlink Shared Channel
UE: User Equipment
eNB: evolved NodeB, evolved base station
gNB: NR base station
TTI: Transmission Time Interval
OFDM: Orthogonal Frequency Division Multiplexing
C-RNTI: Cell Radio Network Temporary Identifier
CSI: Channel State Indicator
HARQ: Hybrid Automatic Repeat Request
CSI-RS: CSI-Reference Signal, channel state measurement reference signal
CRS: Cell Reference Signal
PUCCH: Physical Uplink Control Channel
PUSCH: Physical Uplink Shared Channel
UL-SCH: Uplink Shared Channel
CG: Configured Grant
Sidelink: Sidelink communication
SCI: Sidelink Control Information
PSCCH: Physical Sidelink Control Channel
MCS: Modulation and Coding Scheme
CRB: Common Resource Block
CP: Cyclic Prefix
PRB: Physical Resource Block
PSSCH: Physical Sidelink Shared Channel
FDM: Frequency Division Multiplexing
RRC: Radio Resource Control
RSRP: Reference Signal Receiving Power
SRS: Sounding Reference Signal
DMRS: Demodulation Reference Signal
CRC: Cyclic Redundancy Check
PSDCH: Physical Sidelink Discovery Channel
PSBCH: Physical Sidelink Broadcast Channel
SFI: Slot Format Indication
TDD: Time Division Duplexing
FDD: Frequency Division Duplexing
SIB1: System Information Block Type 1
SLSS: Sidelink Synchronization Signal
PSSS: Primary Sidelink Synchronization Signal
SSSS: Secondary Sidelink Synchronization Signal
PCI: Physical Cell ID
PSS: Primary Synchronization Signal
SSS: Secondary Synchronization Signal
BWP: Bandwidth Part
GNSS: Global Navigation Satellite System
SFN: System Frame Number (radio frame number)
DFN: Direct Frame Number
IE: Information Element
SSB: Synchronization Signal Block
EN-DC: EUTRA-NR Dual Connection
MCG: Master Cell Group
SCG: Secondary Cell Group
PCell: Primary Cell
SCell: Secondary Cell
PSFCH: Physical Sidelink Feedback Channel
AGC: Automatic Gain Control The following is a description of the prior art associated with the solutions of the present disclosure. Unless otherwise specified, the same terms in the specific embodiments have the same meanings as in the prior art.

It is worth pointing out that the V2X and sidelink mentioned in the description of the present disclosure have the same meaning. The V2X herein can also mean sidelink; similarly, the sidelink herein can also mean V2X, and no specific distinction and limitation will be made in the following text.

The resource allocation mode of V2X (sidelink) communication and the transmission mode of V2X (sidelink) communication in the description of the present disclosure can be replaced equivalently.

The description of the present disclosure relates to a sequence-based PSFCH. It is worth pointing out that the design of the PSFCH includes sequence-based design, but is not limited thereto.

In the description of the present disclosure, $\lfloor a \rfloor$ refers to rounding down a, for example $\lfloor 0.5 \rfloor = 1$. In the description of the present disclosure, a mod b refers to a remainder obtained after a is divided by b, for example, 7 mod 4=3.

The PSSCH corresponding to or associated with the SCI in the description of the present disclosure also refers to as an SCI scheduling PSSCH.

Sidelink Communication Scenarios

1) Out-of-coverage sidelink communication: Both of two UEs performing sidelink communication are out of network coverage (for example, the UE detects no cell that meets a "cell selection criterion" on a frequency at which sidelink communication needs to be performed, and that means the UE is out of network coverage).

2) In-coverage sidelink communication: Both of two UEs performing sidelink communication are in network coverage (for example, the UE detects at least one cell that meets a "cell selection criterion" on a frequency at which sidelink communication needs to be performed, and that means the UE is in network coverage).

3) Partial-coverage sidelink communication: One of two UEs performing sidelink communication is out of network coverage, and the other is in network coverage.

From the perspective of a UE side, the UE has only two scenarios, out-of-coverage and in-coverage. Partial-coverage is described from the perspective of sidelink communication. NR V2X unicast, groupcast, and broadcast Existing LTE V2X communication only supports broadcast communication at a physical layer. Broadcast communication is widely applied in scenarios such as cellular communication where a base station transmits a system message to UE in a cell. The design goals of NR V2X include support for unicast communication and groupcast communication at a physical layer. Unicast communication refers to communication between transmitting user equipment (UE) and single receiving user equipment. Groupcast communication generally means that a group of UEs are assigned the same identity (ID), and a UE transmits V2X data to other UEs in the group, and receives V2X data transmitted by other UEs in the group.

HARQ and Sidelink HARQ

In order to better improve the reliability of transmission and improve the spectrum efficiency, an HARQ retransmission mechanism is usually included in unicast communication and groupcast communication. HARQ stands for hybrid automatic repeat request, which can provide an error correction function and implement fast retransmissions, and is widely applied in wireless data communications. HARQ feedback includes HARQ ACK (this feedback information means that reception and decoding are correct) and HARQ NACK (this feedback information means that reception and decoding are not correct). Among them, HARQ ACK means that a receiving UE correctly receives and decodes data of a transmitting UE and therefore feeds back HARQ ACK; HARQ NACK means that the receiving UE does not correctly receive and decode the data of the transmitting UE. When the receiving UE feeds back HARQ NACK, the transmitting UE may retransmit corresponding data to ensure improvement in the reliability of data communication.

NR V2X supports HARQ feedback (or referred to as HARQ-ACK) and HARQ combining at a physical layer, and HARQ ACK and HARQ NACK therein are carried by a physical sidelink feedback channel (PSFCH).

Sidelink Groupcast HARQ

For groupcast sidelink communication, when HARQ feedback is enabled, two HARQ feedback mechanisms are supported, and are as follows:

1) (referred to as mechanism 1) the receiving UE only feeds back HARQ NACK; if the receiving UE decodes a PSCCH correctly but fails to decode a corresponding PSSCH correctly, then the receiving UE feeds back NACK; otherwise, the receiving UE does not perform HARQ feedback;
   a) all receiving UEs in a group share one PSFCH resource used to feed back HARQ NACK.
2) (referred to as mechanism 2) the receiving UE feeds back HARQ ACK and HARQ NACK; if the receiving UE decodes a PSCCH correctly but fails to decode a corresponding PSSCH correctly, then the receiving UE feeds back NACK; if the receiving UE decodes the PSCCH correctly and decodes the corresponding PSSCH correctly, then the receiving UE feeds back ACK.
   a) Each UE in the group uses a separate PSFCH resource to feed back HARQ ACK and HARQ NACK.

A PSFCH resource represents a PSFCH resource mapped to a specific time domain, a specific frequency domain, and a specific code domain.

PSFCH Resource Configuration

In a resource pool, PSFCHs are periodically configured in slots of the resource pool, and the period thereof can be denoted as N, where the value of N may be 1, or 2, or 4. For example, N=1 means that each of the slots configured in the resource pool includes a PSFCH resource. N=2 means that every two consecutive slots of all of the slots configured in the resource pool include a slot including a PSFCH resource. N=4 means that every four consecutive slots of all of the slots configured in the resource pool include a slot including a PSFCH resource.

Sequence-Based PSFCH

Here, $N_{PRB}^{PSFCH}$ is used to represent the number of PRBs (in Rel-16 NR sidelink communication, $N_{PRB}^{PSFCH}=1$) occupied by the PSFCH in the frequency domain, and a sequence length of the PSFCH is therefore denoted as $N_{PRB}^{PSFCH}=N_{sc}^{RB}$, where $N_{sc}^{RB}=12$ This sequence can be expressed as $r^\alpha(n)=e^{j\alpha n} \times r(n)$, where $n=0,1,2,\ldots,N_{PRB}^{PSFCH}=N_{sc}^{RB}-1$, and $\alpha$ represents a cyclic shift of the sequence. Different cyclic shifts may generate different sequences (having the same sequence length), that is, different cyclic shifts represent different PSFCH resources. Specifically, if respective time domain resources and frequency domain resources of two PSFCHs are the same, and if respective cyclic shifts $\alpha$ of the PSFCHs are different (code domain resources are different), then the two PSFCHs represent two different PSFCH resources. On a designated (or determined) time-frequency resource, when an initial sequence is designated (or determined) to be an initial sequence r(n), the number of possible values of $\alpha$ is $N_{PRB}^{PSFCH}=N_{sc}^{RB}$. That is, $r^\alpha(n)$ may generate $N_{PRB}^{PSFCH}=N_{sc}^{RB}$ sequences at most. That is, $N_{PRB}^{PSFCH} \times N_{sc}^{RB}$ different PSFCH resources at most (in Rel-16 NR sidelink communication, the number of PSFCH resources is 12, i.e., 12 different sequences) exist on the designated (or determined) time-frequency resource.

For example, $N_{PRB}^{PSFCH}=1$, and the length of the sequence is $N_{PRB}^{PSFCH}=N_{sc}^{RB}=12$ Therefore, when a certain time-frequency resource is designated, the number of possible values of a is $N_{PRB}^{PSFCH} \times N_{sc}^{RB}=12$, that is, 12 different PSFCH resources exist. If the UE needs to feed back 1-bit HARQ feedback information, then the UE needs to occupy two different PSFCH resources to respectively transmit the HARQ ACK and the HARQ NACK. At most 12/2=6 different UEs can be multiplexed on the designated time-frequency resource for HARQ feedback (each UE feeds back 1-bit HARQ information).

For HARQ-ACK in unicast sidelink communication and in mechanisms 1 and 2 of groupcast sidelink communication, when each UE provides feedback by means of a PSFCH, one sequence needs to correspond to NACK while another sequence corresponds to ACK. Therefore, the concept of a cyclic shift pair is introduced to sidelink communication. One cyclic shift pair (or a cyclic shift pair corresponding to a cyclic shift pair index) includes two different cyclic shifts. In the description of the present invention, $N_{CS}^{PSFCH}$ is used to represent the number of cyclic shift pairs, and the range of the cyclic shift pair index is from 0 to $N_{CS}^{PSFCH}-1$.

Method for Determining Cyclic Shift $\alpha$

In the description of the present invention, the cyclic shift $\alpha$ may also be represented by $\alpha_l$, that is, $\alpha$ and $\alpha_l$ can be equivalently replaced by each other. The method for determining a includes, but is not limited to, the following:

$$\alpha(\alpha_l) = \frac{2\pi}{N_{sc}^{RB}}\left((m_0 + m_{cs} + n_{cs}(n_{s,f}^\mu, l+l'))\bmod N_{sc}^{RB}\right) \text{ where}$$

$$N_{sc}^{RB} = 12;$$

$m_0$ represents an initial cyclic shift;

l represents an OFDM symbol index in PSFCH transmission; since only the PSFCH format with one symbol is supported at present, it can be considered that l=0;

l' represents the index of the first OFDM symbol in the slot in PSFCH transmission, and represents the index of the OFDM symbol in the slot in PSFCH transmission at present;

the specific definition of function $n_{cs}(n_{s,f}^\mu, l)$ is: $n_{cs}(n_{s,f}^\mu, l)=\Sigma_{m=0}^{7} 2^m \cdot c(8N_{symb}^{slot} n_{s,f}^\mu + 8k+m)$ 1), where a method for determining sequence c(n) is as follows:

$c(n)=(x_1(n+N_c)+x_2(n+N_c))\bmod 2$ $x_1(n+31)=(x_1(n+3)+x_1(n))\bmod 2$ $x_2(n+31)=(x_2(n+3)+x_2(n+2)+x_2(n+1)+x_2(n))\bmod 2$ where $N_c=1600$, and an initialized sequence of the first sequence $x_1(n)$ is $x_1(0)=1$, $x_1(n)=0$, $n=1, 2, \ldots, 30$. An initialization sequence of the second sequence $x_2(n)$ can be represented as $c_{init}=\Sigma_{i=0}^{30} x_2(i)=2^i$, that is, $c_{init}$ represents the decimal value of the initialization sequence of the sequence $x_2(n)$. After the value of $c_{init}$ is determined, the initialization sequence of $x_2(n)$ can be obtained (the length of the initialization sequence is also 31), and then $x_2(n)$ can be determined; and then, by combining the same with $x_1(n)$ (the length of the initialization sequence is equal to 31), the UE can determine the scrambling code sequence $c(n)$. Therefore, the solution of the present patent provides a method for determining $c_{init}$. On this basis, the sequence $x_2(n)$ can be determined, and on the basis that the sequence $x_1(n)$ is given, the scrambling code sequence $c(n)$ can be further determined;

$N_{symb}^{slot}$ represents the number of OFDM symbols included in one slot;

$n_{s,f}^{\mu}$ represents the slot number in a system frame;

Each embodiment of the present patent includes the method for determining $m_{cs}$ in the above-mentioned method.

Intra-Group Identifier of UE in Groupcast Mechanism 2

In the embodiment of the present disclosure, the intra-group identifier of UE in groupcast is represented by $M_{ID}$. Optionally, in sidelink groupcast mechanism 2, higher layers (or upper layers) indicate intra-group identifier $M_{ID}$ of the UE in sidelink communication. In one implementation, if the total number of UEs included in a group in groupcast is $N_{sizeGroup}$, the value range of $M_{ID}$ is from 0 to $N_{sizeGroup}-1$. The method used to obtain the value of $M_{ID}$ in the present invention includes, but is not limited to, the above-mentioned method.

Basic Procedure of LTE V2X (Sidelink) Communication

Figure 1:
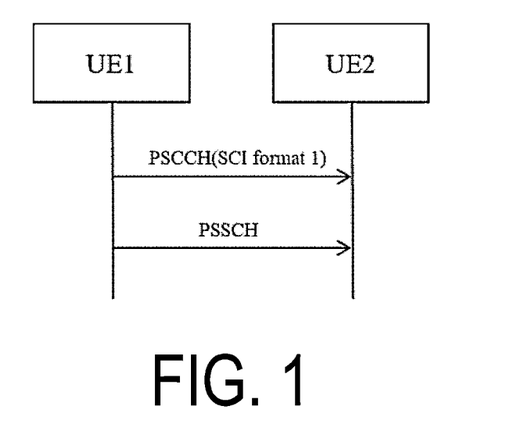
FIG. 1 is a basic procedure diagram schematically showing Rel-14/15 LTE V2X sidelink communication.

FIG. 1 is a schematic diagram showing sidelink communication of LTE V2X UE. First, UE1 transmits to UE2 sidelink control information (SCI format 1), which is carried by a physical layer channel PSCCH. SCI format 1 includes scheduling information of a PSSCH, such as frequency domain resources and the like of the PSSCH. Secondly, UE1 transmits to UE2 sidelink data, which is carried by the physical layer channel PSSCH. The PSCCH and the corresponding PSSCH are frequency division multiplexed, that is, the PSCCH and the corresponding PSSCH are located in the same subframe in the time domain but are located on different PRBs in the frequency domain. Specific design methods of the PSCCH and the PSSCH are as follows:

1) The PSCCH occupies one subframe in the time domain and two consecutive PRBs in the frequency domain. Initialization of a scrambling sequence uses a predefined value of 510. The PSCCH may carry SCI format 1, where SCI format 1 at least includes frequency domain resource information of the PSSCH. For example, for a frequency domain resource indication field, SCI format 1 indicates a starting subchannel index and the number of consecutive subchannels of the PSSCH corresponding to the PSCCH.

2) The PSSCH occupies one subframe in the time domain, and uses frequency division multiplexing (FDM) with respect to the corresponding PSCCH. The PSSCH occupies one or a plurality of consecutive sub-channels in the frequency domain. The sub-channel represents $n_{subCHsize}$ consecutive PRBs in the frequency domain. $n_{subCHsize}$ is configured by an RRC parameter, and a starting sub-channel and the number of consecutive sub-channels are indicated by the frequency domain resource indication field of SCI format 1.

Resource Allocation Mode (Transmission Mode 3/4) of LTE V2X

Figure 2:
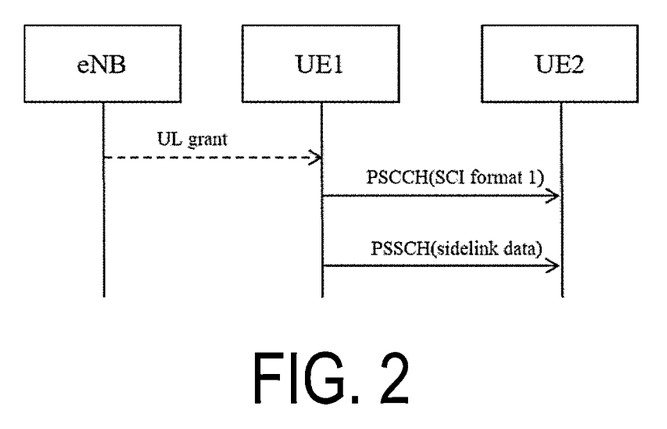
FIG. 2 schematically shows two resource allocation modes for Rel-14/15 LTE V2X.

FIG. 2 shows two resource allocation modes of LTE V2X, which are referred to as base station scheduling-based resource allocation (Transmission Mode 3) and UE sensing-based resource allocation (Transmission Mode 4), respectively. In LTE V2X, in eNB network coverage, a base station can configure, through UE-level dedicated RRC signaling SL-V2X-ConfigDedicated, a resource allocation mode of UE, or referred to as a transmission mode of the UE, which is specifically as follows:

1) Base station scheduling-based resource allocation mode (Transmission Mode 3): the base station scheduling-based resource allocation mode means that frequency domain resources used in sidelink communication are from scheduling of the base station. Transmission Mode 3 includes two scheduling modes, which are dynamic scheduling and semi-persistent scheduling (SPS), respectively. For dynamic scheduling, a UL grant (DCI format 5A) includes the frequency domain resources of the PSSCH, and a CRC of a PDCCH or an EPDCCH carrying the DCI format 5A is scrambled by an SL-V-RNTI. For SPS, the base station configures one or a plurality of (at most 8) configured grants through IE: SPS-ConfigSL-r14, and each configured grant includes a grant index and a resource period of the grant. The UL grant (DCI format 5A) includes the frequency domain resource of the PSSCH, indication information (3 bits) of the grant index, and indication information of SPS activation or release (or deactivation). The CRC of the PDCCH or the EPDCCH carrying the DCI format 5A is scrambled by an SL-SPS-V-RNTI.

Specifically, when RRC signaling SL-V2X-ConfigDedicated is set to scheduled-r14, it indicates that the UE is configured in the base station scheduling-based resource allocation mode. The base station configures the SL-V-RNTI or the SL-SPS-V-RNTI via RRC signaling, and transmits the UL grant to the UE through the PDCCH or the EPDCCH (DCI format 5A, the CRC is scrambled by the SL-V-RNTI or the SL-SPS-V-RNTI). The UL grant includes at least scheduling information of the PSSCH frequency domain resource in sidelink communication. When the UE successfully detects the PDCCH or the EPDCCH scrambled by the SL-V-RNTI or the SL-SPS-V-RNTI, the UE uses a PSSCH frequency domain resource indication field in the UL grant (DCI format 5A) as PSSCH frequency domain resource indication information in a PSCCH (SCI format 1), and transmits the PSCCH (SCI format 1) and a corresponding PSSCH.

For SPS in Transmission Mode 3, the UE receives, on a downlink subframe n, the DCI format 5A scrambled by the SL-SPS-V-RNTI. If the DCI format 5A includes the indication information of SPS activation, then the UE determines frequency domain resources of the PSSCH according to the indication information in the DCI format 5A, and determines time domain resources of the PSSCH (transmission subframes of the PSSCH) according to information such as the subframe n and the like.

2) UE sensing-based resource allocation mode (Transmission Mode 4): The UE sensing-based resource allocation mode means that resources used for sidelink communication are based on a procedure of sensing a candidate available resource set by the UE. When the RRC signaling SL-V2X-ConfigDedicated is set to ue-Selected-r14, it indicates that the UE is configured in the UE sensing-based transmission mode. In the UE sensing-based transmission mode, the base station configures an available transmission resource pool, and the UE determines a PSSCH sidelink transmission resource in the transmission resource pool according to a certain rule (for a detailed description of the procedure, see the LTE V2X UE sensing procedure section), and transmits a PSCCH (SCI format 1) and a corresponding PSSCH.

Numerologies in NR (Including NR Sidelink) and Slots in NR (Including NR Sidelink)

A numerology comprises two aspects: a subcarrier spacing and a cyclic prefix (CP) length. NR supports five subcarrier spacings, which are respectively 15 kHz, 30 kHz, 60 kHz, 120 kHz and 240 kHz (corresponding to p=0, 1, 2, 3, 4). Table 4.2-1 shows the supported transmission numerologies specifically as follows:

TABLE 4.2-1

Subcarrier Spacings Supported by NR

| $\mu$ | $\Delta f = 2^\mu \cdot 15$ [KHz] | CP (cyclic prefix) |
|---|---|---|
| 0 | 15 | Normal |
| 1 | 30 | Normal |
| 2 | 60 | Normal, Extended |
| 3 | 120 | Normal |
| 4 | 240 | Normal |

Only when p=2, that is, in the case of a 60-kHz sub-carrier spacing, an extended CP is supported, whereas only a normal CP is supported in the case of other sub-carrier spacings. For a normal CP, each slot includes $N_{symb}^{slot}=14$ OFDM symbols; and for an extended CP, each slot includes $N_{symb}^{slot}=12$ OFDM symbols. For $\mu=0$, namely, a 15-kHz subcarrier spacing, one slot=1 ms; for $\mu=1$, namely, a 30-kHz subcarrier spacing, one slot=0.5 ms; for $\mu=2$, namely, a 60-kHz subcarrier spacing, one slot=0.25 ms, and so on.

NR and LTE have the same definition for a subframe, which denotes 1 ms. For subcarrier spacing configuration $\mu$, a slot number in one subframe (1 ms) may be denoted as $n_s^\mu$, and ranges from 0 to $N_{slot}^{subframe,\mu}-1$; a slot number in one system frame (having a duration of 10 ms) may be denoted as $n_{s,f}^\mu$, and ranges from 0 to $N_{slot}^{frame,\mu}-1$. Respective definitions of $N_{slot}^{subframe,\mu}$ and $N_{slot}^{frame,\mu}$ for different subcarrier spacings $\mu$ are shown in the following tables.

Table 4.3.2-1: the number of symbols included in each slot, the number of slots included in each system frame, and the number of slots included in each subframe for a normal CP

| $\mu$ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 4.3.2-2: the number of symbols included in each slot, the number of slots included in each system frame, and the number of slots included in each subframe for an extended CP (60 kHz)

| $\mu$ | $N_{symb}^{slot}$ | $N_{slot}^{frame,\mu}$ | $N_{slot}^{subframe,\mu}$ |
|---|---|---|---|
| 2 | 12 | 40 | 4 |

On an NR carrier, a system frame (or simply referred to as frame) number (SFN) ranges from 0 to 1023. The concept of a direct frame number (DFN) is introduced to sidelink communication, and the number likewise ranges from 0 to 1023. The above description of the relationships between system frames and numerologies can likewise be applied to a direct frame. For example, a duration of one direct frame is likewise equal to 10 ms; for a subcarrier interval of 15 kHz, one direct frame includes 10 slots, and so on. The DFN is applied to timing on a sidelink carrier.

Sidelink Resource Pool

In sidelink communication, resources transmitted and received by UEs all belong to resource pools. For example, for a base station scheduling-based transmission mode in sidelink communication (transmission mode 1 in NR sidelink communication), the base station schedules transmission resources for a sidelink UE in a resource pool; alternatively, for a UE sensing-based transmission mode in sidelink communication (transmission mode 2 in NR sidelink communication), the UE determines a transmission resource in a resource pool.

Embodiment 1

Figure 3:
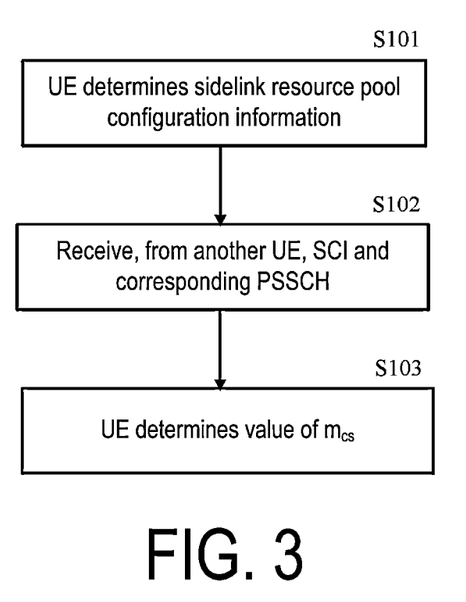
FIG. 3 is a basic flowchart schematically showing a method performed by user equipment according to embodiments 1-4 of the present disclosure.

As shown in FIG. 3, in Embodiment 1 of the present invention, a method performed by user equipment may include:

In step S101, sidelink user equipment determines sidelink resource pool configuration information.

Optionally, the sidelink resource pool configuration information is configuration information transmitted by a base station through RRC signaling. Or, optionally, the sidelink resource pool configuration information is included in pre-configuration information of the user equipment.

Optionally, the sidelink resource pool configuration information includes rbSetPSFCH, which is configuration information of a PRB set actually used for PSFCH transmission and reception. Optionally, the configuration information of a PRB set actually used for PSFCH transmission and reception is bitmap indicated rbSetPSFCH. Optionally, $M_{PRB,set}^{PSFCH}$ is equal to the number of is or the number of 0s in the bitmap indicated rbSetPSFCH.

Optionally, the sidelink resource pool configuration information includes configuration information about the number of subchannels $N_{subch}$.

Optionally, the sidelink resource pool configuration information includes PSFCH resource period configuration information $N_{PSSCH}^{PSFCH}$.

Optionally, the sidelink resource pool configuration information includes configuration information about the number of cyclic shift pairs $N_{CS}^{PSFCH}$.

Optionally, the sidelink resource pool configuration information includes initial cyclic shift configuration information $m_0$. Optionally, the value range of $m_0$ is from 0 to 11, or the value range of $m_0$ is from 0 to $N_{CS}^{PSFCH}-1$ in a unit of cyclic shift pair.

Optionally, the sidelink resource pool configuration information includes indication information used to indicate (configure) a mapping relationship $N_{type}^{PSFCH}$ between the PSSCH and the PSFCH as follows: $N_{type}^{PSFCH}=1$, or, $N_{type}^{PSFCH}$ is equal to the number of occupied subchannels in PSSCH transmission.

In step S102, the user equipment receives, from another user equipment, sidelink control information (SCI) and a corresponding or associated PSSCH.

Optionally, the SCI includes $1^{st}$ stage SCI and/or $2^{nd}$ stage SCI.

Optionally, the $1^{st}$ stage SCI and/or the $2^{nd}$ stage SCI includes indication information used to indicate the number of occupied subchannels in the corresponding PSSCH transmission Optionally, the $1^{st}$ stage SCI and/or the $2^{nd}$ stage SCI includes a source identifier (source ID) $P_{ID}$ of the other user equipment. Optionally, the source ID is an 8-bit or 16-bit bit string.

Optionally, higher layers (or upper layers) indicate the intra-group identifier $M_{ID}$ of the UE. Optionally, if the PSSCH transmission is unicast transmission or the UE determines that the HARQ feedback mechanism is mechanism 1 according to the $1^{st}$ stage SCI and/or the $2^{nd}$ stage SCI, then $M_{ID}=0$. Optionally, if the UE determines that the HARQ feedback mechanism is mechanism 2 according to the $1^{st}$ stage SCI and/or the $2^{nd}$ stage SCI, then $M_{ID}$ represents the intra-group identifier of the UE.

In step S103, the UE determines the value of $m_{cs}$ which is used for determining the cyclic shift $\alpha(\alpha_l)$.

Optionally, the UE determines the value of $m_{cs}$ according to a cyclic shift pair number (or index) i.

Optionally, for NACK (0) feedback, $m_{cs}=i$; for ACK(1) feedback, $m_{cs}=i+6$. Or, optionally, for NACK (0) feedback, $m_{cs}=i+6$; for ACK(1) feedback, $m_{cs}=i$.

Or,
optionally, the UE determines the value of $m_{cs}$ according to a cyclic shift i' corresponding to the cyclic shift pair number (or index) i. Optionally, the correspondence between i and i' is pre-defined, or fixed, or pre-configured.

Optionally, $$i' = \left(\frac{6}{N_{CS}^{PSFCH}}\right) \times i,$$

or i' is an integer between 0 and 11. Optionally, for NACK (0) feedback, $m_{cs}=i'$; for ACK(1) feedback, $m_{cs}=(i'+6)\bmod 12$ or $m_{cs}=(i'+6)$. Or, optionally, for NACK (0) feedback, $m_{cs}=(i'+6)\bmod 12$, or $m_{cs}=(i'+6)$; for ACK(1) feedback, $m_{cs}=i'$. Or, optionally, $$i' = \left(\frac{12}{N_{CS}^{PSFCH}}\right) \times i,$$

or i' is an integer between 0 and 11. Optionally, for NACK (0) feedback, $m_{cs}=i'$; for ACK(1) feedback, $$m_{cs} = \left(i' + \left(\frac{12}{N_{CS}^{PSFCH}} - 1\right)\right) \bmod 12,$$

or $$m_{cs} = \left(i' + \frac{12}{N_{CS}^{PSFCH}} - 1\right).$$

Or, optionally, for NACK (0) feedback, $$m_{cs} = \left(i' + \frac{12}{N_{CS}^{PSFCH}} - 1\right) \bmod 12,$$

or $$m_{cs} = \left(i' + \frac{12}{N_{CS}^{PSFCH}} - 1\right).$$

For ACK (1) feedback, $m_{cs}=i'$.

Optionally, the cyclic shift pair index $i=\lfloor(P_{ID}+M_{ID})\bmod R_{PRB,CS}^{PSFCH}/(N_{type}^{PSFCH} \cdot M_{subch,slot}^{PSFCH})\rfloor$, where optionally, $M_{subch,slot}^{PSFCH}=M_{PRB,set}^{PSFCH}/(N_{subch} \cdot N_{PSSCH}^{PSFCH})$; optionally, $R_{PRB,CS}^{PSFCH}=N_{type}^{PSFCH} \cdot M_{subch,slot}^{PSFCH} \cdot N_{CS}^{PSFCH}$; $N_{type}^{PSFCH}=1$ or $N_{type}^{PSFCH}=N_{subch}^{PSSCH}$, or, $i=(P_{ID}+M_{ID})\bmod N_{CS}^{PSFCH}$.

Embodiment 2

As shown in FIG. 3, in Embodiment 2 of the present invention, a method performed by user equipment may include:

in step S101, sidelink user equipment determines sidelink resource pool configuration information.

Optionally, the sidelink resource pool configuration information is configuration information transmitted by a base station through RRC signaling. Or, optionally, the sidelink resource pool configuration information is included in pre-configuration information of the user equipment.

Optionally, the sidelink resource pool configuration information includes rbSetPSFCH, which is configuration information of a PRB set actually used for PSFCH transmission and reception. Optionally, the configuration information of a PRB set actually used for PSFCH transmission and reception is bitmap indicated rbSetPSFCH. Optionally, $M_{PRB,set}^{PSFCH}$ is equal to the number of is or the number of 0s in the bitmap indicated rbSetPSFCH.

Optionally, the sidelink resource pool configuration information includes configuration information about the number of subchannels $N_{subh}$.

Optionally, the sidelink resource pool configuration information includes PSFCH resource period configuration information $N_{PSSCH}^{PSFCH}$.

Optionally, the sidelink resource pool configuration information includes configuration information about the number of cyclic shift pairs $N_{CS}^{PSFCH}$.

Optionally, the sidelink resource pool configuration information includes initial cyclic shift configuration information $m_0$. Optionally, the value range of $m_0$ is from 0 to 11, or the value range of $m_0$ is from 0 to $N_{CS}^{PSFCH}-1$ in a unit of cyclic shift pair.

In step S102, the user equipment receives, from another user equipment, sidelink control information (SCI) and a corresponding or associated PSSCH.

Optionally, the SCI includes $1^{st}$ stage SCI and/or $2^{nd}$ stage SCI.

Optionally, the $1^{st}$ stage SCI and/or the $2^{nd}$ stage SCI includes indication information used to indicate the number of occupied subchannels in the corresponding PSSCH transmission $N_{subch}^{PDDCH}$.

Optionally, the $1^{st}$ stage SCI and/or the $2^{nd}$ stage SCI includes indication information used to indicate a mapping relationship between the PSSCH and the PSFCH as follows: $N_{type}^{PSFCH}=1$, or $N_{type}^{PSFCH}$ is equal to $N_{subch}^{PSSCH}$.

Optionally, the $1^{st}$ stage SCI and/or the $2^{nd}$ stage SCI includes a source identifier (source ID) $P_{ID}$ of the other user equipment. Optionally, the source ID is an 8-bit or 16-bit bit string.

Optionally, higher layers (or upper layers) indicate the intra-group identifier $M_{ID}$ of the UE. Optionally, if the PSSCH transmission is unicast transmission or the UE determines that the HARQ feedback mechanism is mechanism 1 according to the $1^{st}$ stage SCI and/or the $2^{nd}$ stage SCI, then $M_{ID}=0$. Optionally, if the UE determines that the HARQ feedback mechanism is mechanism 2 according to the $1^{st}$ stage SCI and/or the $2^{nd}$ stage SCI, then $M_{ID}$ represents the intra-group identifier of the UE.

In step S103, the UE determines the value of $m_{cs}$, which is used for determining the cyclic shift $\alpha(\alpha_l)$.

Optionally, the UE determines the value of $m_{cs}$ according to a cyclic shift pair number (or index) i.

Optionally, for NACK (0) feedback, $m_{cs}=i$; for ACK(1) feedback, $m_{cs}=i+6$. Or, optionally, for NACK (0) feedback, $m_{cs}=i+6$; for ACK(1) feedback, $m_{cs}=i$.

Or, optionally, the UE determines the value of $m_{cs}$ according to a cyclic shift i' corresponding to the cyclic shift pair number (or index) i. Optionally, the correspondence between i and i' is pre-defined, or fixed, or pre-configured.

Optionally, $$i' = \left(\frac{6}{N_{CS}^{PSFCH}}\right) \times i,$$

or i' is an integer between 0 and 11. Optionally, for NACK (0) feedback, $m_{cs}=i'$; for ACK(1) feedback, $m_{cs}=(i'+6) \bmod 12$ or $m_{cs}=(i'+6)$. Or, optionally, for NACK (0) feedback, $m_{cs}=(i'+6) \bmod 12$, or $m c_s=(i'+6)$; for ACK(1) feedback, $m_{cs}=i'$. Or, optionally, $$i' = \left(\frac{12}{N_{CS}^{PSFCH}}\right) \times i,$$

or i' is an integer between 0 and 11. Optionally, for NACK (0) feedback, $m_{cs}=i'$; for ACK(1) feedback, $$m_{cs} = \left(i' + \frac{12}{N_{CS}^{PSFCH}} - 1\right) \bmod 12,$$

or $$m_{cs} = \left(i' + \frac{12}{N_{CS}^{PSFCH}} - 1\right).$$

Or, optionally, for NACK (0) feedback, $$m_{cs} = \left(i' + \frac{12}{N_{CS}^{PSFCH}} - 1\right) \bmod 12,$$

or $$m_{cs} = \left(i' + \frac{12}{N_{CS}^{PSFCH}} - 1\right).$$

For ACK (1) feedback, $m_{cs}=i'$.

Optionally, the cyclic shift pair index $i = \lfloor (P_{ID}+M_{ID}) \bmod R_{PRB,CS}^{PSFCH}/(N_{type}^{PSFCH} \cdot M_{subch,slot}^{PSFCH}) \rfloor$, where optionally, $M_{subch,slot}^{PSFCH}=M_{PRB,set}^{PSFCH}/(N_{subch} \cdot N_{PSSCH}^{PSFCH})$; optionally, $R_{PRB,CS}^{PSFCH}=N_{type}^{PSFCH} \cdot M_{subch,slot}^{PSFCH} \cdot N_{CS}^{PSFCH}$; $N_{type}^{PSFCH}=1$ or $N_{type}^{PSFCH}=N_{subch}^{PSSCH}$, or, $i=(P_{ID}+M_{ID}) \bmod N_{CS}^{PSFCH}$.

Embodiment 3

As shown in FIG. 3, in Embodiment 3 of the present invention, a method performed by user equipment may include:

in step S101, sidelink user equipment determines sidelink resource pool configuration information.

Optionally, the sidelink resource pool configuration information is configuration information transmitted by a base station through RRC signaling. Or, optionally, the sidelink resource pool configuration information is included in pre-configuration information of the user equipment.

Optionally, the sidelink resource pool configuration information includes rbSetPSFCH, which is configuration information of a PRB set actually used for PSFCH transmission and reception. Optionally, the configuration information of a PRB set actually used for PSFCH transmission and reception is bitmap indicated rbSetPSFCH. Optionally, $M_{PRB,set}^{PSFCH}$ is equal to the number of is or the number of 0s in the bitmap indicated rbSetPSFCH. Optionally, the sidelink resource pool configuration information includes configuration information about the number of subchannels $N_{subch}$.

Optionally, the sidelink resource pool configuration information includes PSFCH resource period configuration information $N_{PSSCH}^{PSFCH}$.

Optionally, the sidelink resource pool configuration information includes configuration information about the number of cyclic shift pairs $N_{CS}^{PSFCH}$.

Optionally, the sidelink resource pool configuration information includes initial cyclic shift configuration information $m_0$. Optionally, the value range of $m_0$ is from 0 to 11, or the value range of $m_0$ is from 0 to $B_{CS}^{PSFCH}-1$ in a unit of cyclic shift pair.

In step S102, the user equipment receives, from another user equipment, sidelink control information (SCI) and a corresponding or associated PSSCH.

Optionally, the SCI includes $1^{st}$ stage SCI and/or $2^{nd}$ stage SCI.

Optionally, the $1^{st}$ stage SCI and/or the $2^{nd}$ stage SCI includes a source identifier (source ID) $P_{ID}$ of the other user equipment. Optionally, the source ID is an 8-bit or 16-bit bit string.

Optionally, higher layers (or upper layers) indicate the intra-group identifier $M_{ID}$ of the UE. Optionally, if the PSSCH transmission is unicast transmission or the UE determines that the HARQ feedback mechanism is mechanism 1 according to the $1^{st}$ stage SCI and/or the $2^{nd}$ stage SCI, then $M_{ID}=0$. Optionally, if the UE determines that the HARQ feedback mechanism is mechanism 2 according to the 1$^{st}$ stage SCI and/or the 2$^{nd}$ stage SCI, then M$_{ID}$ represents the intra-group identifier of the UE.

In step S103, the UE determines the value of m$_{cs}$, which is used for determining the cyclic shift $\alpha(\alpha_l)$.

Optionally, the UE determines the value of m$_{cs}$ according to a cyclic shift pair number (or index) i.

Optionally, for NACK (0) feedback, m$_{cs}$=i; for ACK(1) feedback, m$_{cs}$=i+6. Or, optionally, for NACK (0) feedback, m$_{cs}$=i+6; for ACK(1) feedback, m$_{cs}$=i.

Or, optionally, the UE determines the value of m$_{cs}$ according to a cyclic shift i' corresponding to the cyclic shift pair number (or index) i. Optionally, the correspondence between i and i' is pre-defined, or fixed, or pre-configured.

Optionally, $$i' = \left(\frac{6}{N_{CS}^{PSFCH}}\right) \times i,$$

or i' is an integer between 0 and 11. Optionally, for NACK (0) feedback, m$_{cs}$=i'; for ACK(1) feedback, m$_{cs}$=(i'+6)mod 12 or m$_{cs}$=(i'+6). Or, optionally, for NACK (0) feedback, m$_{cs}$=(i'+6)mod 12, or m$_{cs}$=(i'+6); for ACK(1) feedback, m$_{cs}$=i'. Or, optionally, $$i' = \left(\frac{12}{N_{CS}^{PSFCH}}\right) \times i,$$

or i' is an integer between 0 and 11. Optionally, for NACK (0) feedback, m$_{cs}$=i'; for ACK(1) feedback, $$m_{cs} = \left(i' + \frac{12}{N_{CS}^{PSFCH}} - 1\right) \bmod 12,$$

or $$m_{cs} = \left(i' + \frac{12}{N_{CS}^{PSFCH}} - 1\right).$$

Or, optionally, for NACK (0) feedback, $$m_{cs} = \left(i' + \frac{12}{N_{CS}^{PSFCH}} - 1\right) \bmod 12,$$

or $$m_{cs} = \left(i' + \frac{12}{N_{CS}^{PSFCH}} - 1\right).$$

For ACK (1) feedback, m$_{cs}$=i'.

Optionally, the cyclic shift pair index i=$\lfloor (P_{ID}+M_{ID}) \bmod R_{PRB,CS}^{PSFCH}/M_{subch,slot}^{PSFCH} \rfloor$, where optionally, M$_{subch,slot}^{PSFCH}$=M$_{PRB,set}^{PSFCH}$/(N$_{subch}$·N$_{PSSCH}^{PSFCH}$); optionally, R$_{PRB,CS}^{PSFCH}$=M$_{subch,slot}^{PSFCH}$·N$_{CS}^{PSFCH}$; or, i=(P$_{ID}$+M$_{ID}$)mod N$_{CS}^{PSFCH}$.

Embodiment 4

As shown in FIG. 3, in Embodiment 4 of the present invention, a method performed by user equipment may include:

in step S101, sidelink user equipment determines sidelink resource pool configuration information.

Optionally, the sidelink resource pool configuration information is configuration information transmitted by a base station through RRC signaling. Or, optionally, the sidelink resource pool configuration information is included in pre-configuration information of the user equipment.

Optionally, the sidelink resource pool configuration information includes rbSetPSFCH, which is configuration information of a PRB set actually used for PSFCH transmission and reception. Optionally, the configuration information of a PRB set actually used for PSFCH transmission and reception is bitmap indicated rbSetPSFCH. Optionally, M$_{PRB,set}^{PSFCH}$ is equal to the number of 1s or the number of 0s in the bitmap indicated rbSetPSFCH.

Optionally, the sidelink resource pool configuration information includes configuration information about the number of subchannels N$_{subch}$.

Optionally, the sidelink resource pool configuration information includes PSFCH resource period configuration information N$_{PSSCH}^{PSFCH}$.

Optionally, the sidelink resource pool configuration information includes configuration information about the number of cyclic shift pairs N$_{CS}^{PSFCH}$.

Optionally, the sidelink resource pool configuration information includes initial cyclic shift configuration information m$_0$. Optionally, the value range of m$_0$ is from 0 to 11, or the value range of m$_0$ is from 0 to N$_{CS}^{PSFCH}$−1 in a unit of cyclic shift pair.

In step S102, the user equipment receives, from another user equipment, sidelink control information (SCI) and a corresponding or associated PSSCH.

Optionally, the SCI includes 1$^{st}$ stage SCI and/or 2$^{nd}$ stage SCI.

Optionally, the 1$^{st}$ stage SCI and/or the 2$^{nd}$ stage SCI includes indication information used to indicate the number of occupied subchannels in the corresponding PSSCH transmission N$_{subch}^{PSSCH}$.

Optionally, the 1$^{st}$ stage SCI and/or the 2$^{nd}$ stage SCI includes a source identifier (source ID) P$_{ID}$ of the other user equipment. Optionally, the source ID is an 8-bit or 16-bit bit string.

Optionally, higher layers (or upper layers) indicate the intra-group identifier M$_{ID}$ of the UE. Optionally, if the PSSCH transmission is unicast transmission or the UE determines that the HARQ feedback mechanism is mechanism 1 according to the 1$^{st}$ stage SCI and/or the 2$^{nd}$ stage SCI, then M$_{ID}$=0. Optionally, if the UE determines that the HARQ feedback mechanism is mechanism 2 according to the 1$^{st}$ stage SCI and/or the 2$^{nd}$ stage SCI, then M$_{ID}$ represents the intra-group identifier of the UE.

In step S103, the UE determines the value of m$_{cs}$, which is used for determining the cyclic shift $\alpha(\alpha_l)$.

Optionally, the UE determines the value of m$_{cs}$ according to a cyclic shift pair number (or index) i.

Optionally, for NACK (0) feedback, m$_{cs}$=i; for ACK(1) feedback, m$_{cs}$=i+6. Or, optionally, for NACK (0) feedback, m$_{cs}$=i+6; for ACK(1) feedback, m$_{cs}$=i.

Or, optionally, the UE determines the value of m$_{cs}$ according to a cyclic shift i' corresponding to the cyclic shift pair number (or index) i. Optionally, a corresponding relation between i and i' is pre-defined, or fixed, or pre-configured.
Optionally, $$i' = \left(\frac{6}{N_{CS}^{PSFCH}}\right) \times i,$$

or i' is an integer between 0 and 11. Optionally, for NACK (0) feedback, $m_{cs}=i'$; for ACK(1) feedback, $m_{cs}=(i'+6) \mod 12$ or $m_{cs}=(i'+6)$. Or, optionally, for NACK (0) feedback, $m_{cs}=(i'+6) \mod 12$, or $m_{cs}=(i'+6)$; for ACK(1) feedback, $m_{cs}=i'$. Or, optionally, or $$i' = \left(\frac{12}{N_{CS}^{PSFCH}}\right) \times i,$$

i' is an integer between 0 and 11. Optionally, for NACK (0) feedback, $m_{cs}=i'$; for ACK(1) feedback, $$m_{cs} = \left(i' + \frac{12}{N_{CS}^{PSFCH}} - 1\right) \mod 12,$$

or $$m_{cs} = \left(i' + \frac{12}{N_{CS}^{PSFCH}} - 1\right).$$

Or, optionally, for NACK (0) feedback, $$m_{cs} = \left(i' + \frac{12}{N_{CS}^{PSFCH}} - 1\right) \mod 12,$$

or $$m_{cs} = \left(i' + \frac{12}{N_{CS}^{PSFCH}} - 1\right).$$

For ACK (1) feedback, $m_{cs}=i'$.

Optionally, the cyclic shift pair index $i=\lfloor (P_{ID}+M_{ID}) \mod R_{PRB,CS}^{PSFCH}/(N_{subch}^{PSSCH} \cdot M_{subch,slot}^{PSFCH}) \rfloor$, where optionally, $M_{subch,slot}^{PSFCH}=M_{PRB,set}^{PSFCH}/(N_{subch} \cdot N_{PSSCH}^{PSFCH})$; optionally, $R_{PRB,CS}^{PSFCH}= N_{subch}^{PSSCH} \cdot M_{subch,slot}^{PSFCH} \cdot N_{CS}^{PSFCH}$; or $i=(P_{ID}+M_{ID}) \mod N_{CS}^{PSFCH}$.

Figure 4:
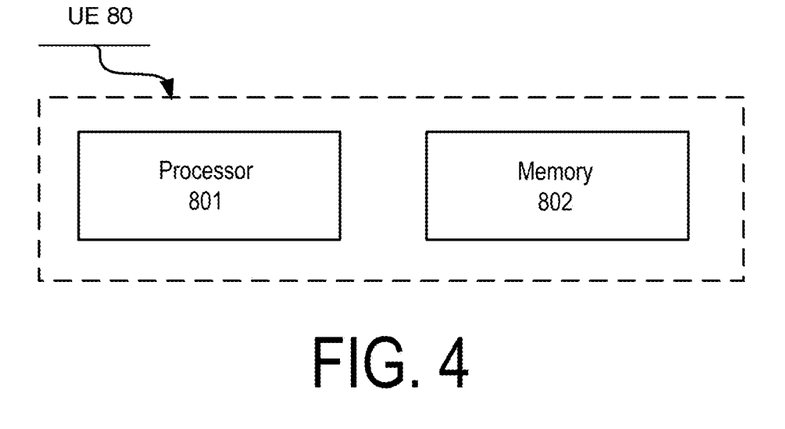
FIG. 4 is a block diagram schematically showing the user equipment according to the present disclosure.

FIG. 4 is a block diagram showing the user equipment (UE) according to the present disclosure. As shown in FIG. 4, user equipment (UE) 80 includes a processor 801 and a memory 802. The processor 801 may include, for example, a microprocessor, a microcontroller, an embedded processor, and the like. The memory 802 may include, for example, a volatile memory (such as a random access memory (RAM)), a hard disk drive (HDD), a non-volatile memory (such as a flash memory), or other memories. The memory 802 stores program instructions. The instructions, when run by the processor 801, can perform the above method performed by user equipment described in detail in the present disclosure.

The methods and related devices according to the present disclosure have been described above in conjunction with preferred embodiments. It should be understood by those skilled in the art that the methods shown above are only exemplary, and the above embodiments can be combined with one another as long as no contradiction arises. The method according to the present disclosure is not limited to steps or sequences shown above. The network node and user equipment illustrated above may include more modules. For example, the network node and user equipment may further include modules that can be developed or will be developed in the future to be applied to a base station, an MME, or UE, and the like. Various identifiers shown above are only exemplary, not for limitation, and the present disclosure is not limited to specific information elements serving as examples of these identifiers. A person skilled in the art could make various alterations and modifications according to the teachings of the illustrated embodiments.

It should be understood that the above embodiments of the present disclosure may be implemented through software, hardware, or a combination of software and hardware. For example, various components inside the base station and the user equipment in the above embodiments may be implemented through various devices, which include, but are not limited to, analog circuit devices, digital circuit devices, digital signal processing (DSP) circuits, programmable processors, application specific integrated circuits (ASICs), field programmable gate arrays (FPGAs), programmable logic devices (CPLDs), and the like.

In this application, the "base station" may refer to a mobile communication data and control exchange center with large transmission power and a wide coverage area, including functions such as resource allocation and scheduling, data reception and transmission. "User equipment" may refer to a user mobile terminal, for example, including terminal devices that can communicate with a base station or a micro base station wirelessly, such as a mobile phone, a laptop computer, and the like.

In addition, the embodiments of the present disclosure disclosed herein may be implemented on a computer program product. More specifically, the computer program product is a product provided with a computer-readable medium having computer program logic encoded thereon. When being executed on a computing device, the computer program logic provides related operations to implement the above-described technical solutions of the present disclosure.

When being executed on at least one processor of a computing system, the computer program logic enables the processor to perform the operations (methods) described in the embodiments of the present disclosure. Such an arrangement of the present disclosure is typically provided as software, code, and/or other data structures that are configured or encoded on a computer-readable medium, such as an optical medium (for example, a CD-ROM), a floppy disk, or a hard disk, or other media such as firmware or microcode on one or more ROM or RAM or PROM chips, or downloadable software images, shared database and so on in one or more modules. Software or firmware or such configuration may be installed on a computing equipment such that one or more processors in the computing equipment perform the technical solutions described in the embodiments of the present disclosure.

In addition, each functional module or each feature of the base station device and the terminal device used in each of the above embodiments may be implemented or executed by a circuit, which is usually one or more integrated circuits.

Circuits designed to execute various functions described in this description may include general-purpose processors, digital signal processors (DSPs), application specific integrated circuits (ASICs) or general-purpose integrated circuits, field programmable gate arrays (FPGAs) or other programmable logic devices, discrete gates or transistor logic, or discrete hardware components, or any combination of the above. The general purpose processor may be a microprocessor, or the processor may be an existing processor, a controller, a microcontroller, or a state machine. The aforementioned general purpose processor or each circuit may be configured by a digital circuit or may be configured by a logic circuit. In addition, when an advanced technology that can replace current integrated circuits emerges because of advances in semiconductor technology, the present disclosure may also use integrated circuits obtained using this advanced technology.

Although the present disclosure has been shown in connection with the preferred embodiments disclosed herein, it will be understood by those skilled in the art that various modifications, substitutions, and alterations may be made therein without departing from the spirit and scope of the present disclosure. Accordingly, the present disclosure should not be defined by the above-described embodiments, but should be defined by the appended claims and their equivalents.

The invention claimed is:

1. A method performed by a user equipment, the method comprising:
   determining a sidelink resource pool configuration transmitted from a base station or included in a pre-configuration, wherein the sidelink resource pool configuration includes a configuration of the number of cyclic shift pairs;
   receiving, from another user equipment, sidelink control information (SCI) and a corresponding or associated physical sidelink shared channel (PSSCH), the SCI including a source identifier $P_{ID}$ of the another user equipment;
   determining a first integer value i at least based on the source identifier $P_{ID}$;
   determining a second integer value that is equal to $$\left(\frac{6}{N_{CS}^{PSFCH}}\right) \times i;$$

and
   determining, based on at least the second integer value, a cyclic shift of a physical sidelink feedback channel (PSFCH) corresponding to the PSSCH, wherein $N_{CS}^{PSFCH}$ is the number of cyclic shift pairs, $N_{CS}^{PSFCH}$ is less than or equal to 6, the first integer value i is a cyclic shift pair index, and $0 \leq i \leq N_{CS}^{PSFCH}-1$.

2. A user equipment, comprising:
   a processor; and
   a memory having instructions stored therein,
   wherein, on the basis of the instructions, the processor is configured to:
   determine a sidelink resource pool configuration transmitted from a base station or included in a pre-configuration, wherein the sidelink resource pool configuration includes a configuration of the number of cyclic shift pairs;
   receive, from another user equipment, sidelink control information (SCI) and a corresponding or associated physical sidelink shared channel (PSSCH), the SCI including a source identifier $P_{ID}$ of the another user equipment;
   determine a first integer value i at least based on the source identifier $P_{ID}$;
   determine a second integer value that is equal to $$\left(\frac{6}{N_{CS}^{PSFCH}}\right) \times i;$$

and
   determine, based on at least the second integer value, a cyclic shift of a physical sidelink feedback channel (PSFCH) corresponding to the PSSCH, wherein $N_{CS}^{PSFCH}$ is the number of cyclic shift pairs, $N_{CS}^{PSFCH}$ is less than or equal to 6, the first integer value i is a cyclic shift pair index, and $0 \leq i \leq N_{CS}^{PSFCH}-1$.

* * * * *